United States Patent

Ohta

Patent Number: 5,913,743
Date of Patent: Jun. 22, 1999

[54] AUTO-TENSIONER

[75] Inventor: Hideyuki Ohta, Yao, Japan

[73] Assignee: Koyo Seiko Co., Ltd., Osaka, Japan

[21] Appl. No.: 08/887,900

[22] Filed: Jul. 3, 1997

[30] Foreign Application Priority Data

Jul. 8, 1996 [JP] Japan .................................. 8-198300

[51] Int. Cl.⁶ .............................. F16H 7/10; F16H 7/14; F16H 7/12; F16H 7/20
[52] U.S. Cl. .......................... 474/112; 474/117; 474/135; 474/199
[58] Field of Search .................................... 474/101, 109, 474/112, 113, 114, 115, 116, 117, 133, 135, 197, 198, 199

[56] References Cited

U.S. PATENT DOCUMENTS

| 2,196,255 | 4/1940 | Dow . | |
| 4,474,562 | 10/1984 | Heurich . | |
| 4,696,663 | 9/1987 | Thomey et al. | 474/135 |
| 4,725,260 | 2/1988 | Komorowski et al. | 474/135 |
| 4,808,148 | 2/1989 | Holtz | 474/135 |
| 4,923,435 | 5/1990 | Kadota et al. | 474/135 |
| 5,045,029 | 9/1991 | Dec et al. | 474/135 |
| 5,073,148 | 12/1991 | Dec | 474/135 |
| 5,207,620 | 5/1993 | Yamamoto et al. | 474/135 |
| 5,328,415 | 7/1994 | Furutani et al. | 474/135 |
| 5,591,094 | 1/1997 | Farmer et al. | 474/135 |
| 5,713,808 | 2/1998 | Ohta | 474/135 |
| 5,718,649 | 2/1998 | Hong et al. | 474/133 |
| 5,772,549 | 6/1998 | Berndt et al. | 474/135 |

FOREIGN PATENT DOCUMENTS

| 2587078 | 3/1987 | France . |
| 63-3550 | 1/1988 | Japan . |
| 3-20145 | 1/1991 | Japan . |
| 8-184357 | 7/1996 | Japan . |
| 681910 | 6/1993 | Switzerland . |
| 2257491 | 1/1993 | United Kingdom . |

*Primary Examiner*—John A. Jeffery
*Assistant Examiner*—Matthew A. Kaness
*Attorney, Agent, or Firm*—Thelen Reid & Priest LLP

[57] ABSTRACT

An auto-tensioner has an arrangement wherein a pivoting member rotatably supports a pulley in contacted relation with a belt and is pivotally biased by a spring for pressing the pulley against the belt. A bracket is press fitted around the outer periphery of the pivoting member and one end of the spring is locked to the bracket. A first fit portion disposed at the pivoting member and a second fit portion disposed at the bracket are fitted with each other for restriction of a relative rotation between the pivoting member and the bracket.

8 Claims, 9 Drawing Sheets

Prior Art

FIG. 15

Prior Art

AUTO-TENSIONER

BACKGROUND OF THE INVENTION

The present invention relates to an auto-tensioner for imparting a predetermined tension to a belt wound about a pulley.

Conventionally, auto-tensioners have been utilized for maintaining a constant tension of belts wound about a plurality of driven shafts, such as camshafts, of automotive vehicles.

There has been provided an auto-tensioner comprising a pivoting member rotatably supporting a pulley in contacted relation with a belt and pivotally mounted to a stationary shaft, and pivotal-resistance imparting means adapted to utilize frictional resistance or fluid viscous resistance for imparting a pivotal resistance to the pivoting member thereby absorbing vibrational energy of the belt.

Figure 14:
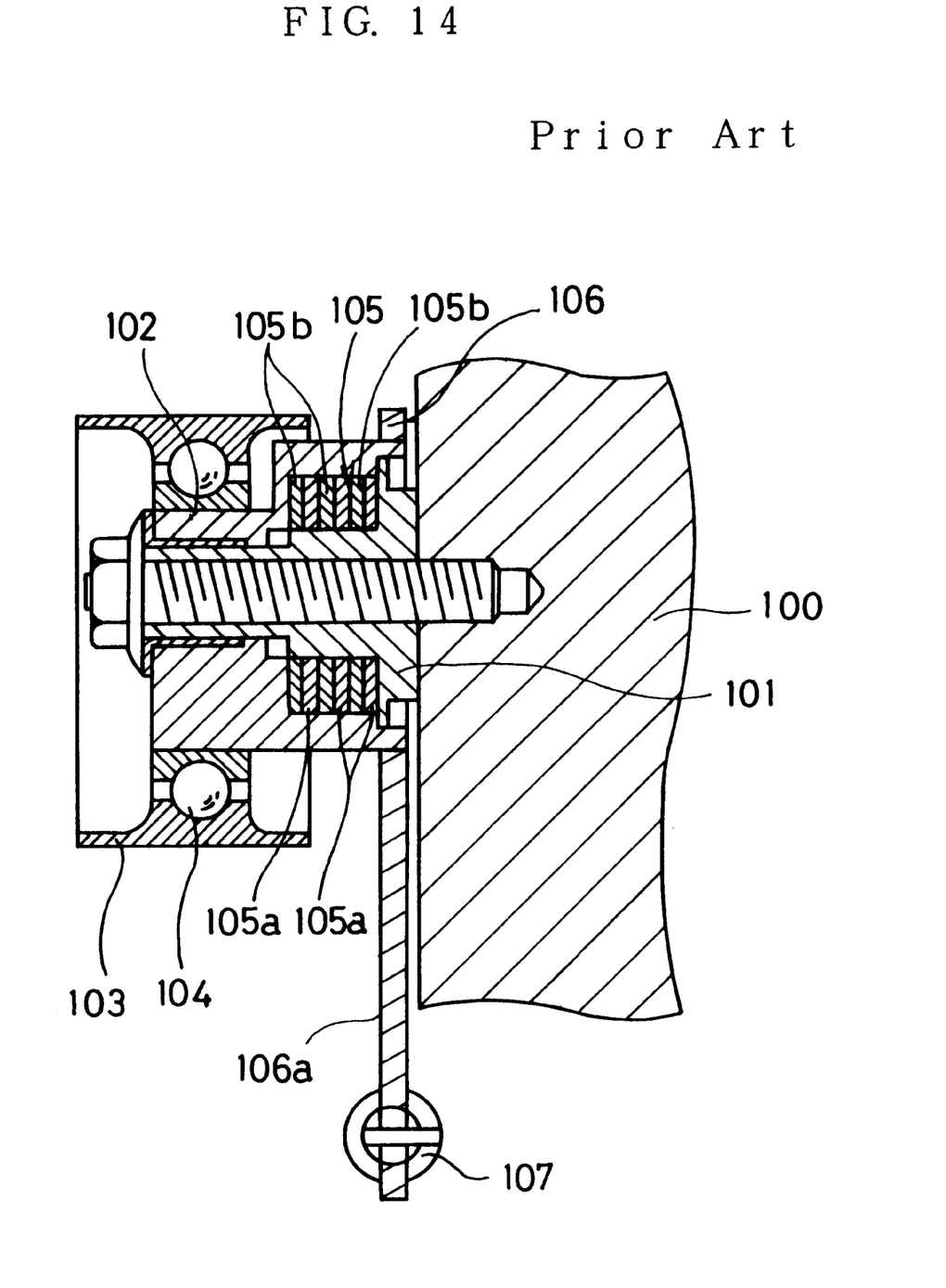
FIG. 14 is a sectional view for illustrating an embodiment of the conventional auto-tensioner.

FIG. 14 is a sectional view for illustrating an example of a conventional auto-tensioner utilizing the fluid viscous resistance. The auto-tensioner comprises a stationary shaft 101 mounted to a bed 100 and a cylindrical pivoting member 102 pivotally fitted around the outer periphery of the stationary shaft 101 in eccentric to the stationary shaft 101. A pulley 103 in rolling contact with an unillustrated belt is rotatably mounted on the outer periphery of the pivoting member 102 by means of a bearing mechanism 104. A multiple-plate damper 105 as the pivotal-resistance imparting means is disposed within the pivoting member 102. The multiple-plate damper 105 includes first discs 105a and second discs 105b in alternating relation the first disc 105a having the outer periphery thereof locked to the pivoting member 102 whereas the second disc 105b having the inner periphery thereof locked to the stationary shaft 101. A viscous fluid, such as oil or the like, is filled in respective spaces between the first and second discs 105a and 105b. A locking arm 106a projects from the outer periphery of an end of the pivoting member 102, whereas a bracket 106 with an annular base portion is press fitted around the end of the pivoting member. Locked to the arm 106a is an end of a helical tension spring 107, an elastic force of which acts to pivotally bias the pivoting member 102 in a predetermined direction.

According to this auto-tensioner, the multiple-plate damper 105 is adapted to impart the pivotal resistance to the pivoting member 102 for absorbing the vibrational energy of the belt. Additionally, the elastic force of the helical tension spring 107 acts to press against the belt at a predetermined pressure.

In this auto-tensioner the bracket 106 for locking the helical tension spring 107 follows the behavior of the belt to repeat a pivotal motion in conjunction with the pulley 103 and the pivoting member 102. Accordingly, the use of the auto-tensioner over an extended period of time results in the occurrence of a relative rotation between the pivoting member 102 and the bracket 106 press fitted therearound. Such a relative rotation causes a positional shift of the bracket 106 to vary the tensile force of the helical tension spring 107 and hence, a proper tensile force cannot be imparted to the belt.

In order to improve the follow-up characteristic of the pivoting member 102, the pulley 103 and the like to the belt, the reduction of the weight thereof is particularly effective. Unfortunately, if the pivoting member 102 is formed of a light metal, such as aluminum or the like, to serve this purpose, the pivoting member 102 suffers a decreased bonding strength with the bracket 106. This leads to a heavy relative rotation between the pivoting member and the bracket.

Figure 15:
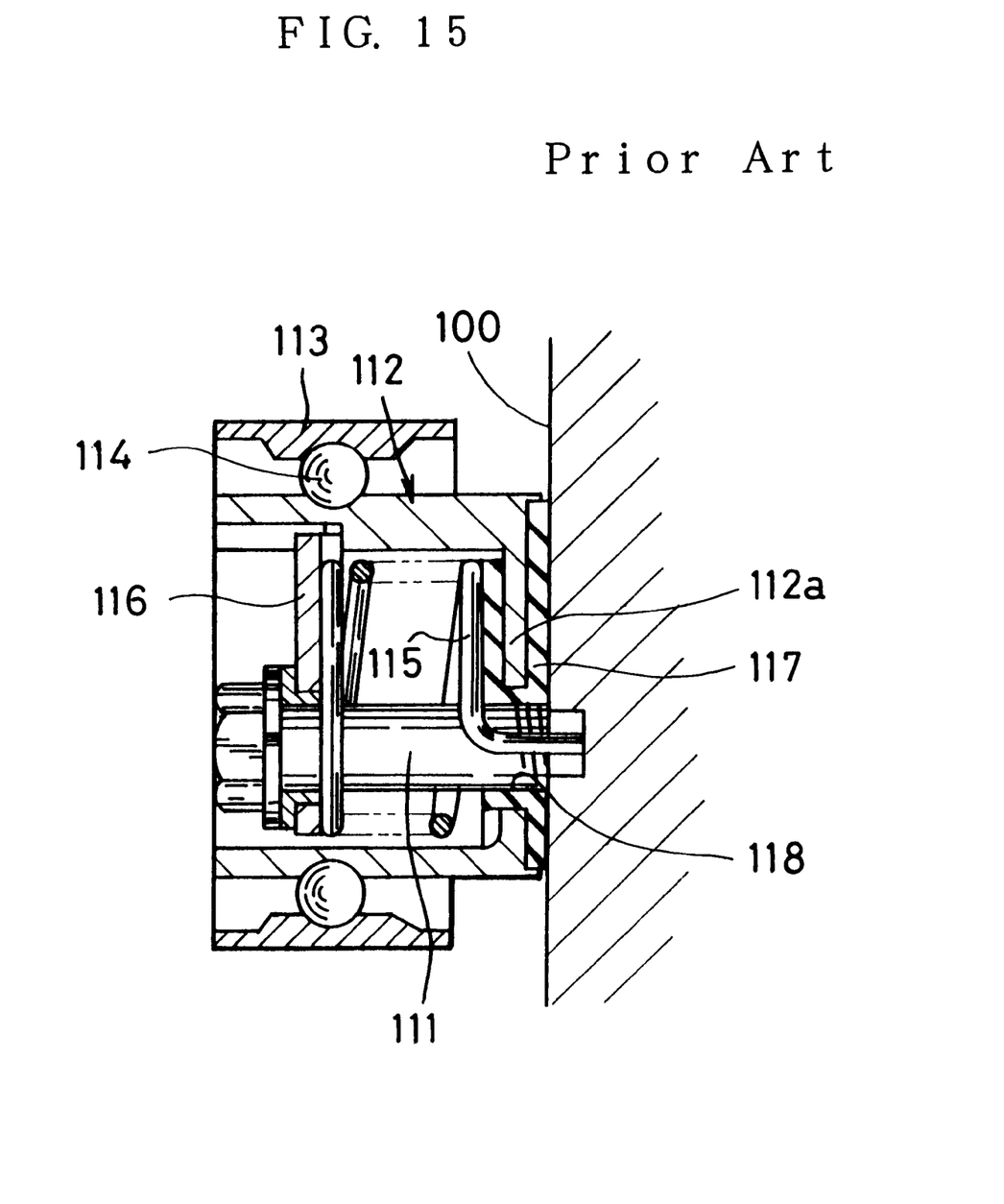
FIG. 15 is a sectional view for illustrating another embodiment of the conventional auto-tensioner.

FIG. 15 is a sectional view for illustrating an example of the conventional auto-tensioner utilizing the frictional resistance.

In this auto-tensioner, a cylindrical pivoting member 112 having a side plate 112a at one end thereof is pivotally fitted around the outer periphery of a stationary shaft 111 mounted to a bed 100. The pivoting member 112 is in eccentric relation with the stationary shaft 111 and axially movably fitted with the stationary shaft 111. A pulley 113 in rolling contact with an unillustrated belt is rotatably mounted on the outer periphery of the pivoting member 112 by means of a bearing mechanism 114. The pivoting member 112 contains a helical torsion coil spring 115, one end of which is locked to the pivoting member 112 and the other end of which is locked to the bed 100. As deformed by torsion and compression, the helical torsion coil spring 115 is interposed between the side plate 112a of the pivoting member 112 and a spring receiving member 116 at the stationary shaft 111. A frictional member 117 is interposed between the side plate 112a of the pivoting member 112 and the bed 100. Interposed between the fitting surfaces of the stationary shaft 111 and the pivoting member 112 is a bushing 118, which is integrally formed with the frictional member 117.

According to the auto-tensioner of the above construction, the compressional resistance of the helical torsion coil spring 115 acts to press the pivoting member 112 against the bed 100 via the frictional member 117. This imparts a predetermined pivotal resistance to the pivoting member 112 for absorbing the vibrational energy of the belt. Furthermore, a torsional resistance of the helical torsion coil spring 115 causes the pivoting member 112 to pivot about the stationary shaft 111 for pressing the belt at a predetermined pressure.

Unfortunately a problem exists with the above auto-tensioner that the pivoting member 112 tends to incline relative to the axis of the stationary shaft 111 because of a load applied by the belt B. Thus, a poor fitting precision for the stationary shaft 111 and the pivoting member 112 may lead to a significant inclination of the pulley 113, which, in turn, causes disengagement of the belt from the pulley 113. Accordingly, the stationary shaft 111 and the pivoting member 112 must be machined with high precision to secure the fitting precision for the both. Consequently, the machining of the stationary shaft 111 and the pivoting member 112 is cumbersome, resulting in increased fabrication costs.

Additionally, the frictional member 117 is apt to wear particularly on its side to receive the inclined pivoting member 112. On the other hand, an unbalanced load tends to affect the bushing 118 interposed between the fitting surfaces of the stationary shaft 111 and the pivoting member 112 and hence, a local wear is likely to occur. Accordingly, a need exist for the use of an expensive, highly wear resistant super engineering plastic material, such as polyether etherketone (PEEK), polyether sulfone (PES) or the like, as the material for the frictional member 117 and the bushing 118. This further increases the fabrication costs for the auto-tensioner.

OBJECT AND SUMMARY OF THE INVENTION

It is therefore, an object of the invention to provide an auto-tensioner assuring the prevention of the occurrence of a relative rotation between the pivoting member and the bracket.

It is another object of the invention to provide an auto-tensioner eliminating the need for providing a high-precision fitting of the stationary shaft and the pivoting member and reducing the material costs for the bushing and the frictional member, thereby achieving the reduction of the overall fabrication costs.

For achieving the above objects, the auto-tensioner of the invention comprises a pivoting member for rotatably supporting a pulley in contacted relation with a belt, a stationary shaft on which the pivoting member is pivotally mounted at a predetermined portion thereof, pivotal-resistance imparting means for imparting a pivotal resistance to the pivoting member, a spring for pivotally biasing the pivoting member thereby pressing the pulley against the belt, a bracket press fitted around the outer periphery of the pivoting member for locking an end of the spring, and rotation-preventive means comprising a first fit portion disposed at the pivoting member and a second fit portion disposed at the bracket in fitted relation with each other so as to restrict a relative rotation between the pivoting member and the bracket.

The auto-tensioner utilizes the rotation-preventive means to positively prevent the occurrence of the relative rotation between the pivoting member and the bracket. Therefore, the spring with its end locked to the bracket is allowed to impart a constant elastic force to the belt in a stable manner, thereby maintaining a proper tension of the belt over an extended period of time.

In carrying out our invention in one preferred mode, the auto-tensioner is characterized in that the pivoting member comprises an aluminum die cast product and the first fit portion of the rotation-preventive means is integrally formed with the pivoting member.

This mode facilitates the forming of the first fit portion at the pivoting member.

According to another preferred mode of the invention, the auto-tensioner is characterized in that the bracket includes a press molded flange portion and the second fit portion is selected from a groove and an aperture formed in a plane including the flange portion.

This mode allows the second fit portion to be molded concurrently with the press molding of the bracket, thus providing an easy forming of the second fit portion.

According to yet another preferred mode of the invention, the auto-tensioner is characterized in that the pivotal-resistance imparting means includes a frictional member having a slidable surface perpendicular to the axis of the stationary shaft and disposed at a local place in the periphery of the stationary shaft, and a resilient member correspondent to the frictional member for pressing the frictional member against a frictional surface disposed at the pivoting member or at the stationary side thereby imparting a pivotal resistance to the pivoting member, the frictional member and the resilient member being located at places such as to prevent the pivoting member from being inclined by a load from the belt.

In this mode, the elastic force of the resilient member acts to prevent the pivoting member from being inclined by the load from the belt. This eliminates the need for fitting the stationary shaft with the pivoting member at high precision. Furthermore, the load of the belt may be evenly imparted to the bushing interposed between the fitting surfaces of the stationary shaft and the pivoting member so that a pressure on the surface of the bushing may be decreased. This eliminates the need for employing an expensive, highly wear-resistant resin material as the material for forming the bushing. In addition, the frictional member is locally provided so as to reduce the material cost therefor. Hence, the auto-tensioner may be fabricated at lower costs.

According to still another preferred mode of the invention, the auto-tensioner is characterized in that the resilient member is formed of a resilient material and one end thereof also serves as the frictional member.

This mode does not require the frictional member to be constructed as an independent component and therefore, the auto-tensioner may be practiced in a more simple structure. This contributes to a further reduction of the fabrication costs.

According to further another preferred mode of the invention, the auto-tensioner is characterized in that the frictional member and the resilient member are disposed at one place on a circumference whose center is the center of the stationary shaft.

This mode requires a minimum number of frictional member and resilient member as the component thereof and therefore, the auto-tensioner of the invention may be practiced in an even more simple structure.

According to yet another preferred mode of the invention, the auto-tensioner is characterized in that the frictional member and the resilient member are disposed at two places on a circumference whose center is the center of the stationary shaft, which places include a place closer to a loading point of the belt and a point opposite thereto across the stationary shaft, and an elastic force of the resilient member closer to the loading point is smaller than that of the resilient member disposed at the opposite place.

In this mode, by virtue of a force corresponding to a difference between the elastic forces of the two resilient members at different places, the pivoting member is prevented from being inclined by the load from the belt. Accordingly, the two resilient members at the different places provide a greater pressure against the frictional surface as well as a greater area where the frictional surface and the frictional members are forced into contact with each other. Hence, the vibrational energy of the belt may be more positively absorbed.

According to still another preferred mode of the invention, the auto-tensioner is characterized in that the frictional member and the resilient member are inserted into a bore defined in the pivoting member.

This mode offers a compact construction of the auto-tensioner. Furthermore, as compared with the case where the frictional member and the resilient member are disposed at the stationary shaft, the auto-tensioner may have a decreased axial length.

DETAILED DESCRIPTION OF THE PREFERRED EMBODIMENTS

The present invention will hereinbelow be described in detail with reference to the accompanying drawings illustrating the preferred embodiments thereof.

As seen in FIGS. 1 to 4, an auto-tensioner of the invention essentially comprises a stationary shaft 1 mounted to a bed A on a stationary side such as an engine, a pivoting member 3 pivotally fitted around the outer periphery of the stationary shaft 1 by means of a bushing 2, a pulley 4 rotatably mounted on the outer periphery of the pivoting member 3 by means of a bearing mechanism 8, a resilient member 5 comprised of a helical compression spring inserted into one end of the pivoting member 3, a frictional member 6 pressed against a frictional surface 11 at the stationary shaft 1 by means of the elastic force of the resilient member 5, a helical tension spring SP for pivotally biasing the pivoting member 3 to press the pulley 4 against a belt B, a bracket 7 press fitted around the pivoting member 3 for locking one end of the helical tension spring SP, and a rotation-preventive section 9 for restricting a relative rotation between the bracket 7 and the pivoting member 3.

The stationary shaft 1 includes a cylindrical shaft portion 12 which is formed with a flange portion 13 at an end thereof at the stationary side. One surface of the flange portion 13 constitutes the frictional surface 11, against which the frictional member 6 is pressed. The stationary shaft 1 is secured to the bed A by means of a bolt 14 extending through the interior of the shaft 1 with the flange portion 13 conformed to the bed A. The stationary shaft is formed by, for example, press molding a pipe material. The bushing 2 fitted around the outer periphery of the stationary shaft is formed of a synthetic resin material such as nylon 46 or the like.

Figure 4:
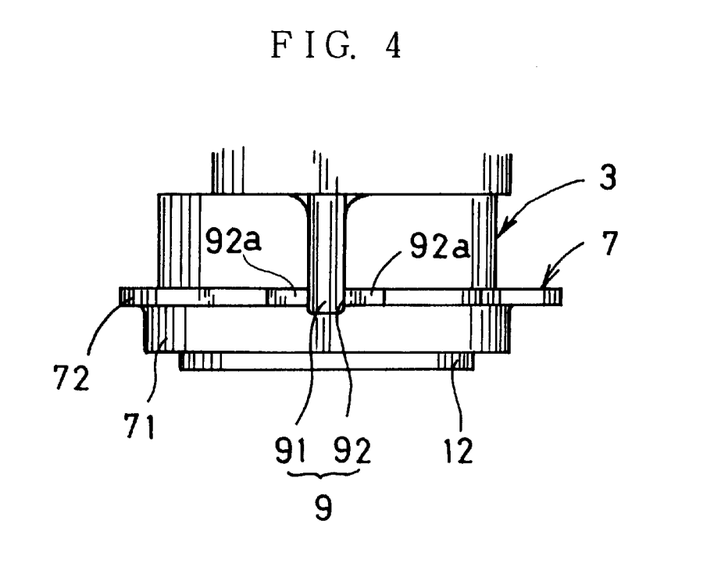
FIG. 4 is a side elevation of a main portion of the auto-tensioner of FIG. 1.

The pivoting member 3 is an eccentric cylindrical member such as comprised of an aluminum die cast product and is rotatably fitted around the stationary shaft 1 as decentered with respect to an upper portion as seen in FIG. 4. The pivoting member 3 is restricted from moving away from the bed A by means of the head of the bolt 14. An end of the pivoting member 3 near the bed A is formed with a cylindrical portion 31 concentric with the axis L of the stationary shaft 1. Press fitted on the outer periphery of the cylindrical portion 31 is an annular bracket 7 on which the helical tension spring SP is hooked.

The bracket 7 is formed in one piece by blanking. The bracket 7 comprises a short cylinder 71 press fitted around the pivoting member 3, a flange portion 72 projecting outwardly from the short cylinder 71, and a leaf-like lock portion 73 projecting further outwardly from the flange portion 72. The helical tension spring SP has one end thereof locked to a lock hole 73a extending through the lock portion 73.

Figure 1:
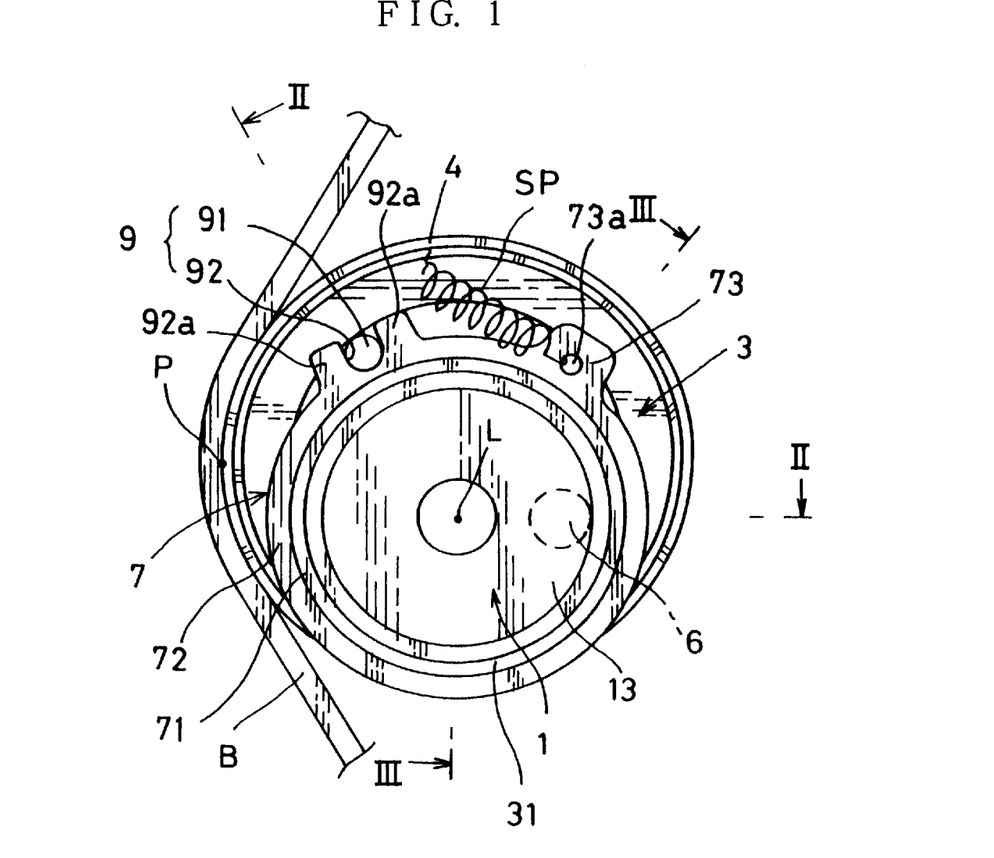
FIG. 1 is a front elevation for illustrating an embodiment of the auto-tensioner according to the invention.
Figure 2:
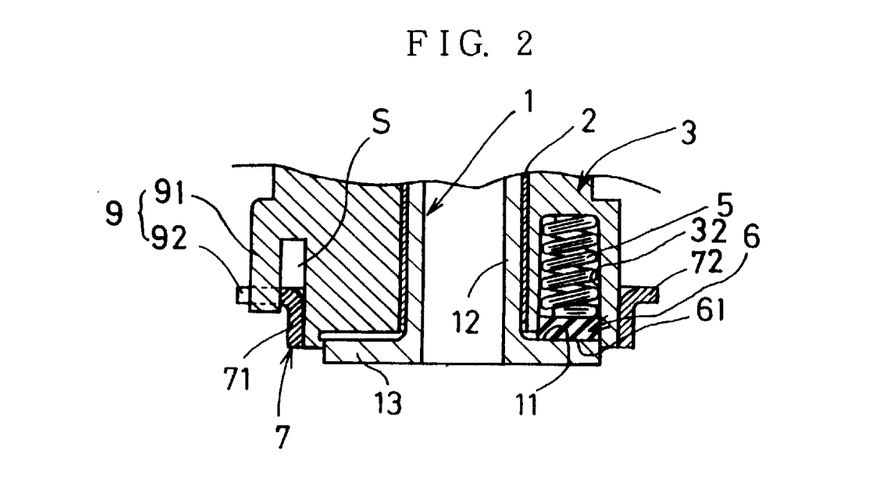
FIG. 2 is a sectional view of a main portion taken on line II—II of FIG. 1.
Figure 3:
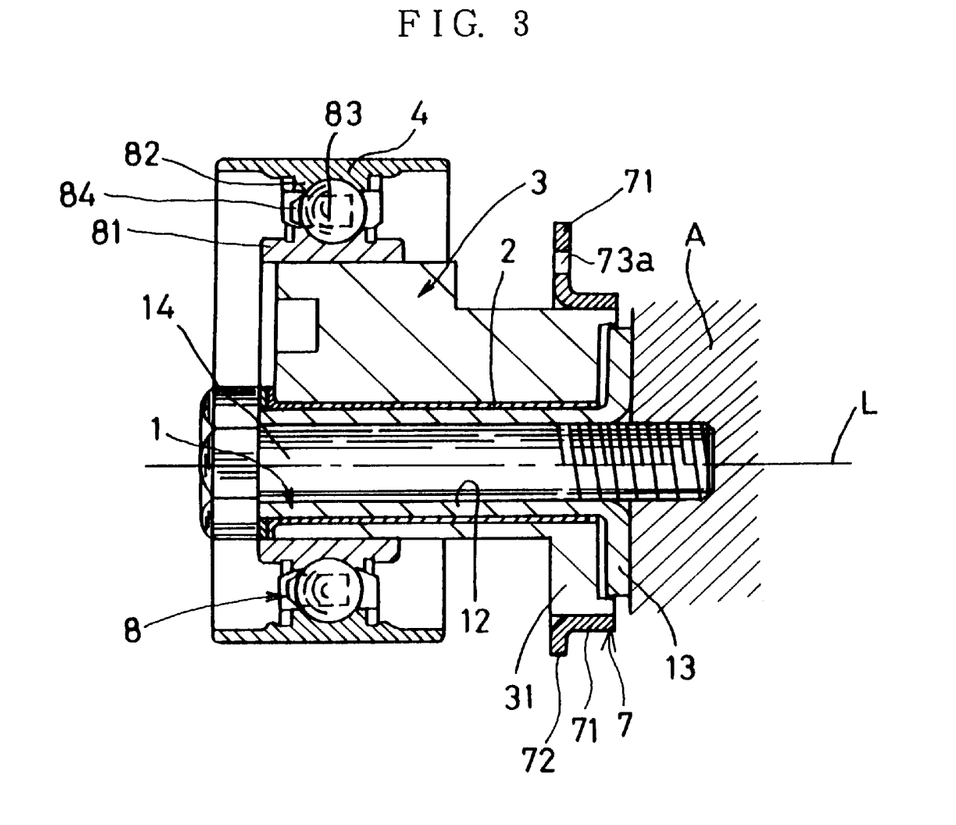
FIG. 3 is a sectional view taken on line III—III of FIG. 1.

The bearing mechanism 8 comprises an inner ring 81 press fitted around the outer periphery of the pivoting member 3, an outer ring 82 integrally formed with the inner periphery of the pulley 4, and a plurality of balls 83 rollably interposed between the inner ring 81 and the outer ring 82. The multiple balls 83 are retained as regularly spaced from each other in respective retainer cases 84 made of a synthetic resin material.

As resiliently contracted the resilient member 5 is inserted into a bore 32 defined in the end portion of the pivoting member 3 near the bed A (see FIG. 2). The bore 32 extends in parallel with the axis L of the stationary shaft 1, having an opening thereof facing the frictional surface 11 of the stationary shaft 1. The bore 32 is formed at a place opposite to the loading point P of the belt B across the stationary shaft 1 and on a circumference whose center is the axis L of the stationary shaft 1 such that the elastic force of the resilient member 5 may prevent the pivoting member 3 from being inclined by the load from the belt B.

The frictional member 6 comprises a disc-like member retractably introduced into the bore 32 in the pivoting member 3. The frictional member 6 is formed of a super engineering plastic material having good wear resistance such as PES, PEEK and the like. A slidable surface 61, or an end surface of the frictional member 6, is pressed against the frictional surface 11 of the stationary shaft 1, as projected from the bore 32 of the pivoting member 3.

Now further referring to FIG. 4, the rotation-preventive section 9 comprises a pin 91, as the first fit portion, disposed at the pivoting member 3, and a groove 92, as the second fit portion, disposed at the bracket 7. The pin 91 is integrally formed with the pivoting member 3 by means of die casting. The pin 91 extends from a predetermined place on the outer periphery of the pivoting member 3 toward the bracket 7 along the generating line of the pivoting member 3. The groove 92 is formed in the same plane that includes the flange portion 72 of the bracket 7. More specifically, the groove 92 is defined between a pair of projections 92a extending radially outwardly from the outer circumference of the flange portion 72. The tip of the pin 91 is fitted in the groove 92. Defined between the tip of the pin 91 and the outer peripheral surface of the pivoting member 3 is a gap S for accommodating the fitting relation therebetween (see FIG. 2).

The auto-tensioner of the above construction utilizes the rotation-preventive section 9 for positively preventing the occurrence of the relative rotation between the pivoting member 3 and the bracket 7. This allows the helical tension spring SP to impart a constant elastic force to the belt over an extended period of time. Furthermore, the pin 91 constituting the rotation-preventive section 9 may be integrally formed the pivoting member 3 by means of die casting and therefore, the fabrication of the pin 91 is facilitated. Additionally, the groove 92 at the bracket 7 is defined in the same plane that includes the flange portion 72 of the bracket 7 and therefore, the groove may be readily formed concurrently with the press molding of the bracket 7.

The above auto-tensioner is adapted to utilize the elastic force of the resilient member 5 for preventing the pivoting member 3 from being inclined relative to the axis L of the stationary shaft 1 due to the load from the belt B. This eliminates the need for fitting the stationary shaft 1 with the pivoting member 3 at high precision and therefore, fitting surfaces of the stationary shaft 1 and the pivoting member 3 may be readily machined at lower costs. Additionally, since the inclination of the pivoting member 3 is prevented, the load from the belt B may be evenly applied to the bushing 2 interposed between the stationary shaft 1 and the pivoting member 3. Consequently, the pressure on the bushing 2 is decreased. This eliminates the need for employing as the material for the bushing 2, an expensive, highly wear-resistant synthetic resin material like the aforesaid super engineering plastics. Furthermore, the frictional member 6 is disposed at only one place in the periphery of the stationary shaft 1, thus accomplishing a notable reduction of the amount of resin material to be used as compared to a case where the frictional member is disposed on the overall length about the stationary shaft 1. Accordingly, the material cost for the frictional member 6 is decreased, leading to the reduction of the fabrication costs for the auto-tensioner.

The above auto-tensioner is arranged such that the frictional member 6 is biased by the resilient member 5 so as to be maintained in a position to bear against the frictional surface 11 even if the frictional member 6 is worn out. Accordingly, the aforesaid super engineering plastics may be replaced by a less expensive synthetic resin material, such polyurethane rubber or the like, as the material for the frictional member 6.

In the above embodiment, the frictional member 6 and the resilient member 5 are inserted into the bore 32 defined in the pivoting member 3 so that the auto-tensioner may be made compact as compared to a case where the frictional member 6 and the resilient member 5 are disposed outwardly of the outer periphery of the pivoting member 3. In addition, the auto-tensioner may have a smaller axial length than a case where the frictional member and the resilient member 6 are disposed at the stationary shaft 1.

Figure 5:
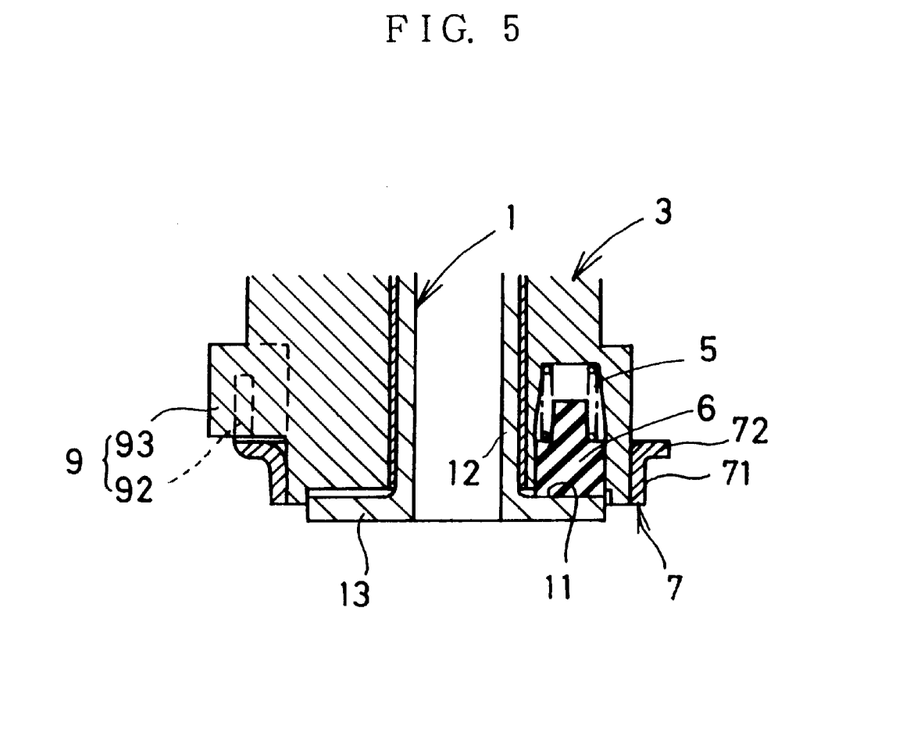
FIG. 5 is a sectional view of a main portion for illustrating another embodiment of a rotation-preventive section.
Figure 6:
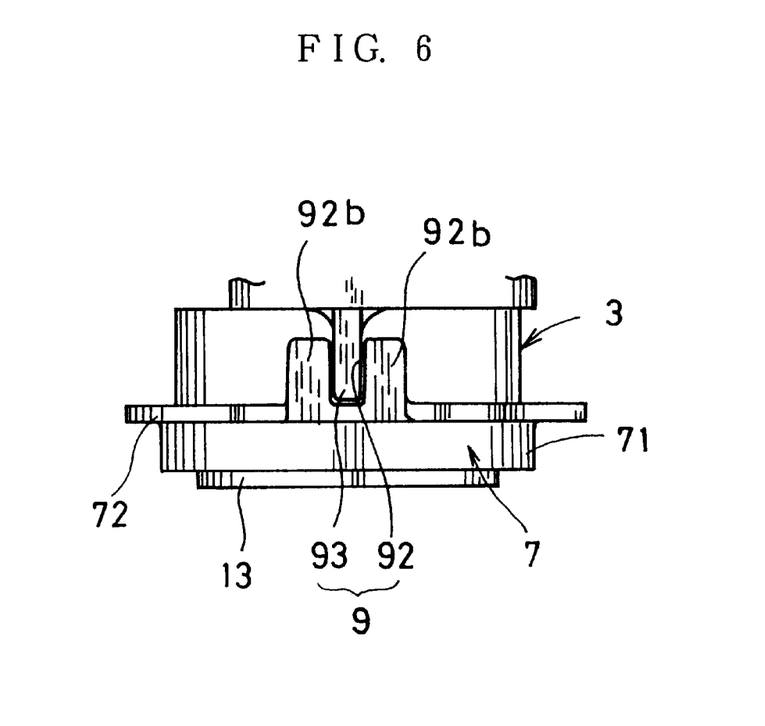
FIG. 6 is a sectional view of a main portion of the auto-tensioner of FIG. 5.

FIGS. 5 and 6 are a side elevation and a sectional view for illustrating a main portion of another embodiment of the rotation-preventive section 9. In this embodiment, the first fit portion at the pivoting member 3 comprises a key 93 whereas the groove 92 at the bracket 7 is defined between a pair of projections 92b extending toward the key 93 from the upper edge of the flange portion 72 of the bracket 7. In this embodiment, too, the key 93 may readily be formed concurrently with the die casting of the pivoting member 3. However, the groove 92 requires a bending for forming the pair of projections 92b.

Figure 7:
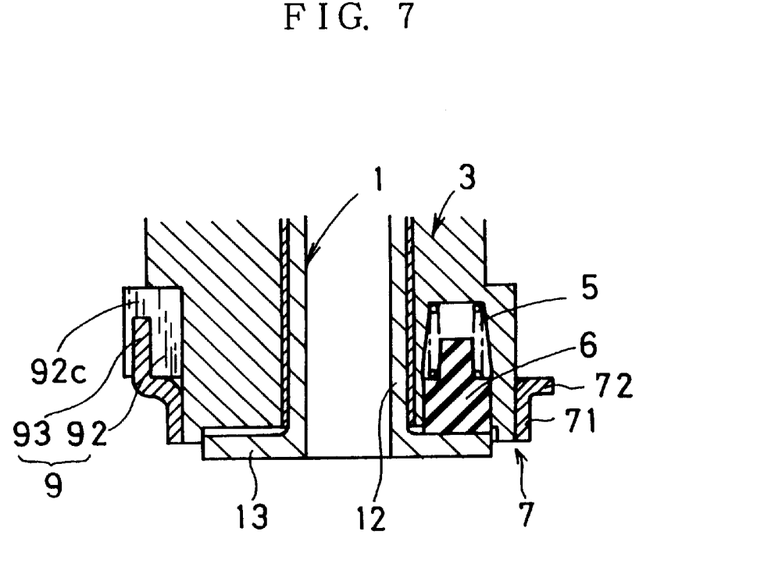
FIG. 7 is a sectional view of a main portion for illustrating still another embodiment of the rotation-preventive section.
Figure 8:
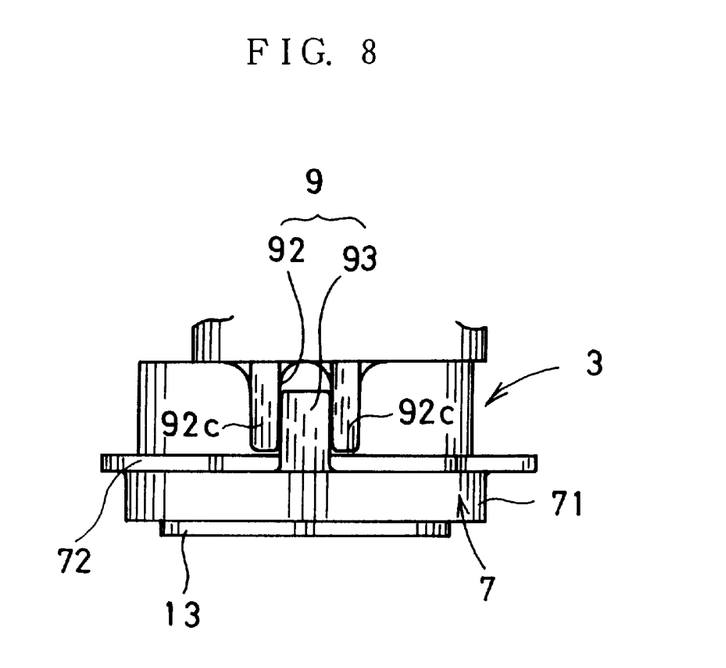
FIG. 8 is a sectional view of a main portion of the auto-tensioner of FIG. 7.

FIGS. 7 and 8 are a side elevation and a sectional view for illustrating a main portion of still another embodiment of the rotation-preventive section 9. In this embodiment, the key 93 is formed at the bracket 7 whereas the groove 92 is formed at the pivoting member 3. The key 93 comprises a projection extending toward the groove 92 from the upper edge of the flange portion 72 of the bracket 7. On the other hand, the groove 92 is defined between a pair of projections 92c projected from the outer periphery of the pivoting member 3.

Figure 9:
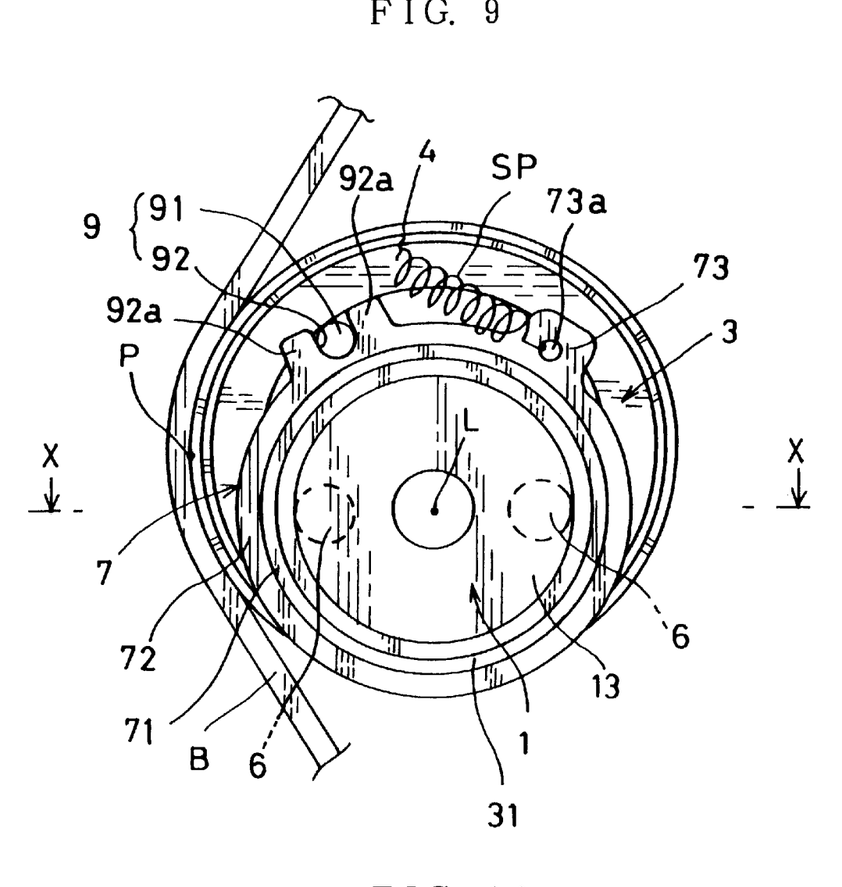
FIG. 9 is a front elevation for illustrating another embodiment of the auto-tensioner.
Figure 10:
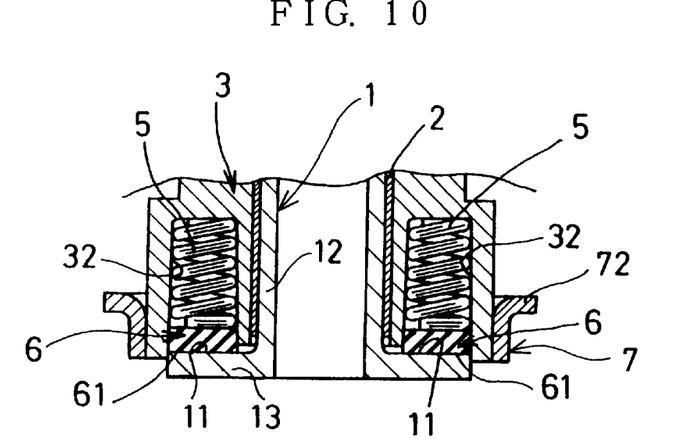
FIG. 10 is a sectional view of a main portion taken on line X—X of FIG. 9.

FIGS. 9 and 10 are a front view and a sectional view of a main portion for illustrating still another embodiment of the invention. This embodiment differs from the embodiment of FIGS. 1 to 4 in that the resilient member 5 is also disposed at place closer to the loading point P of the belt B.

In this embodiment, the end portion of the pivoting member 3 includes two bores 32 for inserting the resilient members 5 disposed at two places on a circumference about the axis L of the stationary shaft 1. One of the bores 32 is defined at place opposite to the loading point P of the belt B across the stationary shaft 1 whereas the other bore 32 is defined at place closer to the loading point P. As resiliently contracted, the resilient members 5 are inserted into the respective bores 32. The aforesaid disc-like frictional members 6 are interposed between the respective resilient members 5 and frictional surface 11 of the stationary shaft 1. It is to be noted that an elastic force of the resilient member 5 closer to the loading point P is smaller than that of the other resilient member 5 whereby the pivoting member 3 is prevented from being inclined by the load from the belt B.

This embodiment is adapted to strongly pressurize the frictional surface 11 of the stationary shaft 1 by means of the two resilient members 5 and also provides an increased area on which the frictional surface 11 and the frictional members 6 are forced into contact with each other. As a results the more positive absorption of the vibrational energy of the belt B is accomplished.

Figure 11:
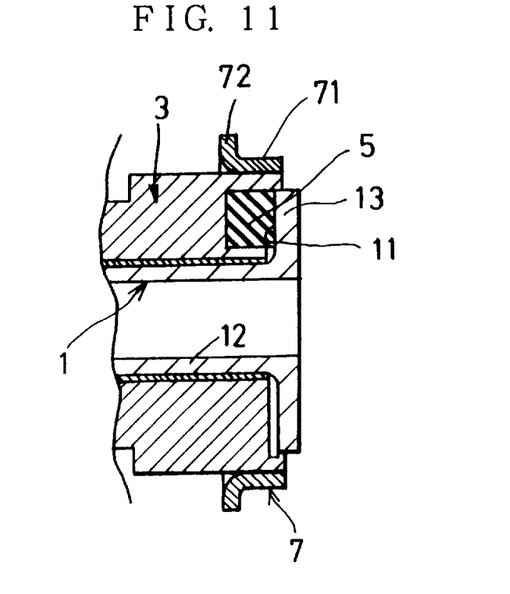
FIG. 11 is a sectional view of a main portion for illustrating still another embodiment of the invention.

FIG. 11 is a sectional view of a main portion for illustrating yet another embodiment of the invention. In this embodiment, the resilient member 5 employs a column-like body of a resilient material such as polyurethane rubber or the like, instead of the helical compression spring. As resiliently contracted in the axial direction, the column-like resilient member 5 has one end thereof bearing directly against the frictional surface 11.

In this embodiment, one end of the resilient member 5 also serves as the frictional member and therefore, the auto-tensioner has a more simple structure than that including an independent frictional member. As a result, the costs are further reduced.

Figure 12:
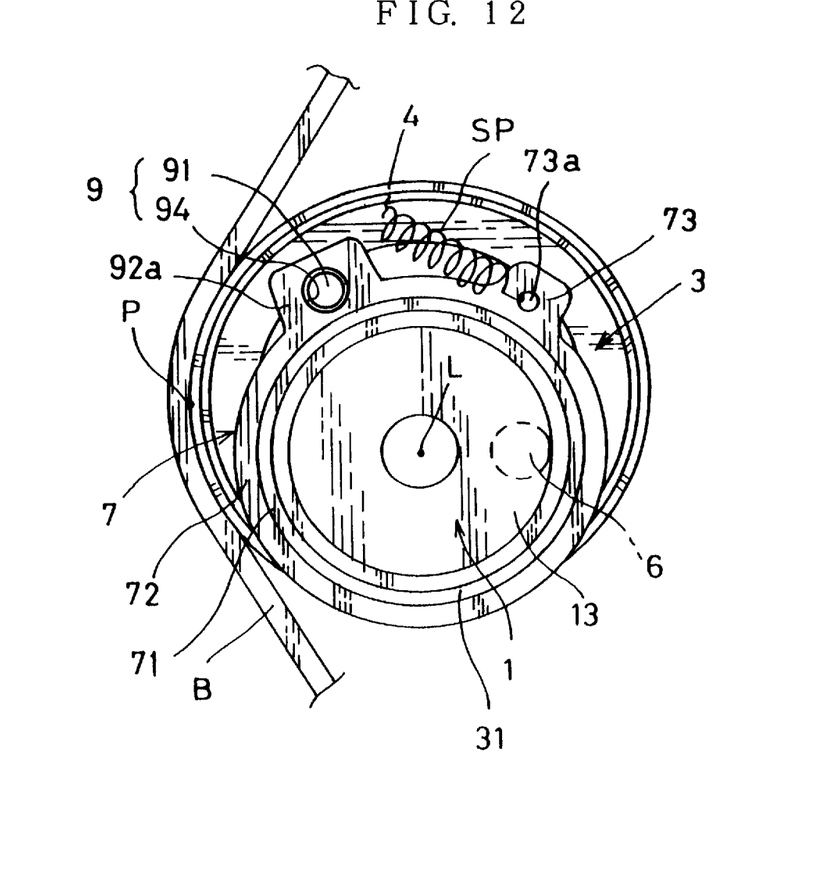
FIG. 12 is a sectional view of a main portion for illustrating further another embodiment of the invention.
Figure 13:
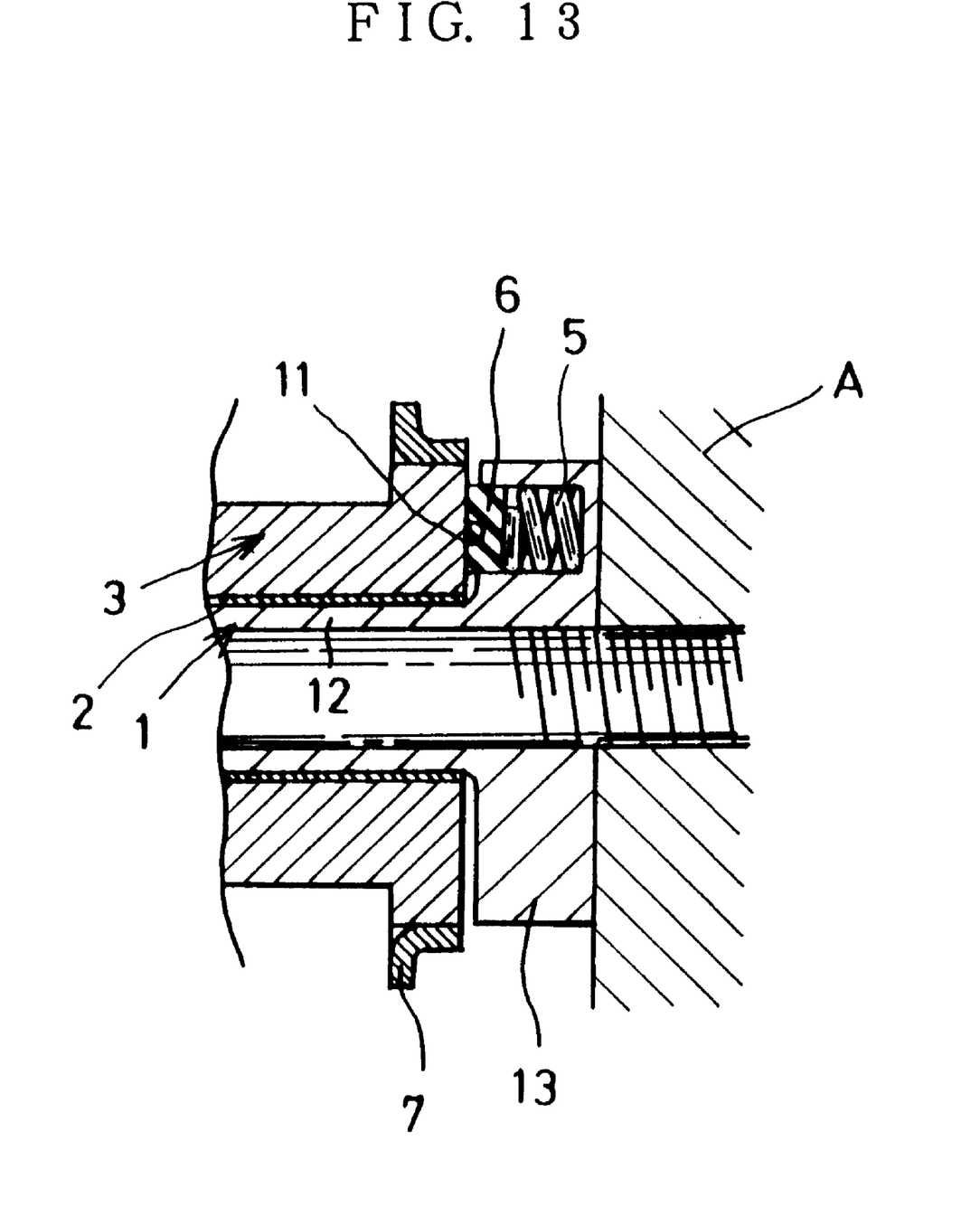
FIG. 13 is a front elevation for illustrating yet another embodiment of the invention.

It is further understood by those skilled in the art that the auto-tensioner of the invention is not limited to the above embodiments and various modifications thereof will occur. For example, as to the embodiment of FIG. 1, the second fit portion may be comprised of an aperture 94 instead of the groove 92 (see FIG. 12). The resilient member 5, the frictional member 6 and the like may be further added. The resilient member 5, the frictional member 6 and the like may be disposed at the stationary shaft 1 while the frictional surface 11 may be disposed at the pivoting member 3 (see FIG. 13). The stationary shaft 1 and a bolt 14 may be formed in one piece and such.

Many apparently widely different embodiments of this invention may be made without departing from the spirit or essential features thereof because the foregoing description is for illustrative purpose only and should not be restrictive in every aspect.

What is claimed is:

1. An auto-tensioner comprising:

a pivoting member for rotatably supporting a pulley in contacted relation with a belt;

a stationary shaft on which said pivoting member is mounted at a predetermined place thereof;

pivotal-resistance imparting means for imparting a pivotal resistance to said pivoting member;

a spring for pivotally biasing said pivoting member thereby pressing the pulley against said belt;

a bracket press fitted around the outer periphery of said pivoting member for locking one end of said spring; and rotation-preventive means comprising a first fit portion disposed at said pivoting member and a second fit portion disposed at said bracket in fitted relation with each other for restricting a relative rotation between said pivoting member and said bracket.

2. An auto-tensioner according to claim 1, wherein said pivoting member is an aluminum die cast product and said first fit portion of said rotation-preventive means is integrally formed with said pivoting member.

3. An auto-tensioner according to claim 1, wherein said bracket includes a press molded flange portion and said second fit portion is selected from a groove and an aperture formed in a plane including said flange portion.

4. An auto-tensioner according to claim 1, wherein said pivotal-resistance imparting means includes:

a frictional member provided with a slidable surface perpendicular to the axis of said stationary shaft and disposed at a local place in the periphery of said stationary shafts, and a resilient member correspondent to said frictional member for pressing said frictional member against a frictional surface disposed at said pivoting member or at a stationary side, thereby imparting a pivotal resistance to said pivoting member, said frictional member and said resilient member being positioned at places such as to prevent said pivoting member from being inclined by a load from said belt.

5. An auto-tensioner according to claim 4, wherein said resilient member is comprised of a resilient material and one end thereof also serves as said frictional member.

6. An auto-tensioner according to claim 5, wherein said frictional member and said resilient member are disposed at one place on a circumference center of which is the center of said stationary shaft.

7. An auto-tensioner according to claim 4, wherein said frictional member and said resilient member are disposed at two places on a circumference center of which is the center of said stationary shaft or at place closer to a loading point of said belt and at place opposite to said loading point across said stationary shaft, and an elastic force of said resilient member closer to said loading point of said belt is smaller than that of said resilient member disposed at the place opposite to said loading point.

8. An auto-tensioner according to claim 4, wherein said frictional member and said resilient member are inserted into a bore defined in said pivoting member.

\* \* \* \* \*